United States Patent Office 3,262,803
Patented July 26, 1966

3,262,803
CATALYTIC LIQUID COMPOSITION FOR CURING POLYMERIZABLE VINYL COMPOUNDS
Erich Bäder, Hanau (Main), and Hubert Koert, Gross-Auheim, Germany, assignors to Deutsche Gold- und Silber-Scheideanstalt vormals Roessler, Frankfurt am Main, Germany
No Drawing. Filed June 20, 1962, Ser. No. 203,718
Claims priority, application Germany, July 7, 1961, D 36,503
12 Claims. (Cl. 106—316)

The present invention relates to an improved hardening liquid for curing polymerizable monomeric organic compounds containing a $CH_2=C<$ group.

The polymerization of monomeric polymerizable organic compounds, such as acrylic acid, methacrylic acid or their esters, styrene and the like, either alone or in admixtures, and, if desired, in the presence of polymers of such compounds and/or in the presence of unsaturated polyester resins with the aid of polymerization catalysts at room temperature is known. The polymerization catalysts in general consist of the actual curing component, usually a peroxidic compound, and of the accelerators or activators appropriate therefor, such as cobalt salts, amines, organic sulfur compounds, heavy metal compounds and the like. In carrying out the polymerization the components of the catalyst system may be added individually at the same time or sequentially. After thorough mixture with the polymerizable composition the polymerization proceeds at room temperature without requiring further measures. As soon as the components of the catalyst are present in the polymerizable composition it is no longer capable of being stored. In some instances it, however, is possible to add one or even more of the components of the catalyst system to the polymerizable composition without completely rendering it incapable of storage but in no instance can the complete catalyst system be added. It also is not possible to combine the curing component and the accelerator in concentrated form as these components, in view of their decomposition, lose their effectiveness or even react explosively with each other. On the other hand, polymerizable compositions containing the accelerator are not always suitable for storage so that in practice a multi-component system always had to be employed for the cold curing thereof. It is clear that difficulties in admixing and dosing of the catalyst system can result. Most errors which are made in cold curing are in connection with these factors.

In order to provide easier admiscibility as well as dosability of the peroxidic curing agent it has generally been used in the form of a 50% paste in a plasticizer such as as dibutyl phthalate. While such hardening pastes have in general given good results, the problem of the necessity of curing a multi-component system is not solved thereby. Such multi-component systems in particular are indispensible in many instances for a thorough and rapid cure and for the production of colorless products. Thus, for example, it is necessary in curing, casting or laminating resins based on methyl methacrylate to employ a catalyst system composed of a peroxidic compound, a sulfur compound, a compound containing a labile halogen atom and a copper compound. Only then are polymerization products obtained having the excellent mechanical properties known in the hot cured products.

According to the invention it was found that monomeric, polymerizable organic compounds or their mixtures, preferably, in the presence of a polymer of the monomeric compounds and/or an unsaturated polyester resin can be cold cured in the presence of a sulfur containing activator and, if desired, in the presence of small quantities of a heavy metal compound while maintaining a two component system if a hardener is employed consisting of a solution of at least one alkyl acyl peroxide and at least one compound containing a labile halogen atom, preferably a labile chlorine atom, in a phlegmatizing liquid. The hardening composition according to the invention, contrary to those previously known, is a liquid which exhibits a high stability and can, for example, be stored for several months at temperatures of $+50°$ C. Such hardening composition furthermore has no tendency to explode and after ignition burns off with a quiet flame. Also, in view of the fact that it is liquid, which, in addition, also is colorless, it can easily be worked into the polymerizable composition and furthermore it is extraordinarily easy to measure out. Previously, when a polymerizable composition containing an organic sulfur compound was to be cured, upon addition of the required halogen containing compound a premature gelling took place after a few hours at room temperature which rendered curing to good polymerization products impossible so that again it was necessary to employ a three component system. This difficulty is avoided when a hardening liquid according to the invention is employed. In fact, its use is especially advantageous when the polymerizable composition contains an organic sulfur compound derived from its preparation, such as when a sulfur compound is employed as a regulator for the production of a certain molecular weight as is the case in the production of casting and laminating resins by partial polymerization of vinyl compounds, especially methyl methacrylate, in the presence of radical forming catalysts and sulfur containing regulators according to German published application 1,083,057 and French Patents 1,221,537 and 1,242,-919. It is also possible to add the sulfur compound only after the monomer polymer mixture has been produced.

The monomeric polymerizable organic compounds which can be cured with the hardening liquid according to the invention include all substances which can be cured by vinyl polymerization. In addition to styrene and the like, examples of such polymerizable substances are acrylic and methacrylic acid and their esters, especially methyl methacrylate, as well as solutions of unsaturated polyester resins in liquid polymerizable organic compounds containing a $CH_2=C<$ group, preferably styrene. Unsaturated polyester resins, for example, are the resinous products derived from dicarboxylic acids or their anhydrides, such as maleic acid, maleic anhydride, fumaric acid, itaconic acid, phthalic acid and the like, and polyhydric alcohols, such as glycol, diglycol, propane diol, butane diol, as well as cyclic alcohols, either the acid component or alcohol component containing at least one ethylenic unsaturation and essentially as polycondensation products of such carboxylic acids and alcohol components (see Polyesters and Their Application, Bjorksten et al., Reinhold Publishing Corp., 1956, page 11, and also U.S. Patents 2,195,362 and 2,255,313).

Expediently, polymers, copolymers or polymer mixtures derived from the monomers to be cured according to the invention are added to such monomeric substances to be cured to expedite the progress of curing.

The sulfur containing organic compounds which can be employed as the sulfur containing activator referred to above, for example, can be mercaptans, $\alpha$-aminosulfones, $\alpha$-hydroxysulfones, sulfinic acid and its salts. Such activator should be present in the quantities customary in bulk polymerization. Quantities of about 0.01 to 5% by weight are preferred.

Examples of mercaptans for instance are: lauryl mercaptan, decyl mercaptan, octyl mercaptan, butyl mercaptan, esters of mercapto acetic acid, such as glycol dimercapto acetate or isooctylthioglycolate.

Examples of α-aminosulfones and α-hydroxysulfones for instances are:

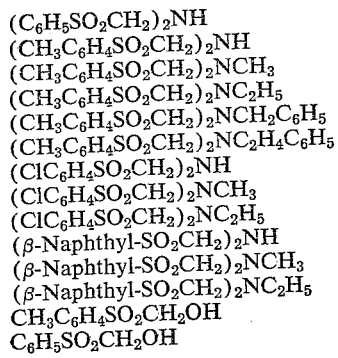

Often it is expedient also to add small quantities of a heavy metal compound to the polymerizable composition. When a mixture of an unsaturated polyester resin and a monomer is to be hardened with the curing liquid according to the invention usually it is not necessary to employ heavy metal compounds and even in this instance the polymerization always proceeds to completion in acceptably short times even at room temperature. The heavy metal compounds when used are used in the usual extremely small quantities, i.e., in γ quantities, e.g., 0.05 p.p.m. to 30 p.p.m.

Copper compounds, such as copper naphthenate, copper octoate, copper acetyl acetonate, copper acetate, copper oleate, copper citrate, copper capronate, copper oxyquinolate, general salts and complexes of copper, but preferably the organic compounds of copper can be used as the heavy metal compounds.

All compounds having a labile halogen atom which are soluble in the monomer and in the phlegmatizing agent can be used as the labile halogen compound contained in the curing liquid according to the invention. Hydrohalides, especially hydrochloride of tertiary amines, and halides, especially chlorides of quaternary ammonium compounds, including ester halides, are preferably employed as compounds containing a labile halogen atom. The quantities in which they can be present in the hardening liquid are only limited by their solubility in the phlegmatizing liquid. In the most cases they will be present in a quantity from 1 to 25% by weight, preferably 1 to 15% by weight.

Examples thereof, for instance, are: trimethylamine hydrochloride, triethylamine hydrochloride, triethanolamine hydrochloride, dibutyl ethanolamine hydrochloride, tributylamine hydrochloride, stearyl dimethylamine hydrochloride, cyclohexyl diethanolamine hydrochloride, p-methylcyclohexyl diethanolamine hydrochloride, tribenzylamine hydrochloride, β-phenylethyl dibutylamine hydrochloride, β-phenylethyl dihexylamine hydrochloride, β-phenylethyl dioctylamine hydrochloride, p-tolylethyl dibutylamine hydrochloride, dimethylaniline hydrochloride, dimethyl-p-toluidine hydrochloride, diethanol-p-chloroaniline hydrochloride, N-diethanol-o-chloro-p-toluidine hydrochloride, dimethyl-p-xylylamine hydrochloride, p,p'-tetramethyldiamino diphenyl methane hydrochloride, cetyl trimethylammonium chloride, triethyl benzyl ammonium chloride, dimethyl isopropanol benzyl ammonium chloride, octadecyl dimethyl benzyl ammonium chloride, triallyl benzyl ammonium chloride, dimethyl cyclohexyl benzyl ammonium chloride, phenylethyl dibutyl ethyl ammonium chloride, phenylethyl dibutyl benzyl ammonium chloride, phenylethyl dihexyl benzyl ammonium chloride, di-β-phenylethyl dibutyl ammonium chloride, p-tolyl-triethyl ammonium chloride, p-tolyl-diethanolethyl ammonium chloride, p-ethyl phenyl ethyl dimethyl ammonium chloride, p-xylylethyl dimethyl ammonium chloride, p-cumylethyl dimethyl ammonium chloride, N-amyl pyridinium chloride, N-benzyl pyridinium chloride, N-ethyl-γ-picolinium chloride, N-cetyl-γ-picolinium chloride, N-β-phenylethal-γ-picolinium chloride, N-ethyl collidonium chloride, N-ethyl quinolinium chloride, N-octyl quinolinium chloride, N-ethyl isoquinolinium chloride, N-ethyl piperidinium hydrochloride, N-phenyl morpholine hydrochloride, pyridine hydrochloride, γ-picoline hydrochloride, collidine hydrochloride, quinoline hydrochloride, quinaldine hydrochloride, isoquinoline hydrochloride, betaine hydrochloride, triethylamine oxide hydrochloride, octadecyl dimethylamine oxide hydrochloride, phenylethyl dibutylamine oxide hydrochloride, tetraethyl-ammonium chloride, trimethyl benzyl ammonium chloride, triethanol benzyl ammonium chloride, N-ethyl pyridinium chloride, N-ethyl quinaldinium chloride, dioxyethyl piperazinium chloride, triethyl amino acetic acid ethyl ester chloride, phenylethyl dibutylamino acetic acid ethyl ester chloride.

Only alkyl acyl peroxides (alkyl peresters) are suitable as the peroxidic compounds contained in the hardening liquids according to the invention. Such alkyl acyl peroxides are of the formula

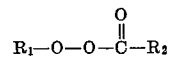

in which $R_1$ signifies an alkyl group and $R_2$ alkyl or aryl. The peroxide content of the curing liquid can be up to 50% and more. The upper limit only being determined by the solubility of the peroxide in the phlegmatizing liquid and the lower by the expected activity, such as, for example, 0.1%. Preferably, however, concentrations of at least 0.5 to 2% are employed in most instances. Expediently, a concentration of about 50% is employed as is customary in usual commercial hardening pastes. Preferably, tertiary butyl perbenzoate and/or tertiary butyl peracetate are employed in the hardening liquids according to the invention.

The phlegmatizing agents which are employed as adjuvants in the hardening liquids according to the invention are generally known as plasticizers, such as dimethyl phthalate, dibutyl phthalate, dioctyl phthalate, dioctyl adipate and the like.

The following examples will serve to illustrate the invention with reference to several specific embodiments.

In such examples the proportions are given in parts by weight unless otherwise specified.

*Example 1*

95.8 parts of tertiary butyl perbenzoate were dissolved in dimethyl phthalate to provide a 50% solution and 4.2 parts of β-phenylethyl dibutylamine hydrochloride also were dissolved therein. The resutling hardening liquid was then employed to cure 20 g. batches of a methyl methacrylate casting resin produced by partial polymerization of pure methyl methacrylate in the presence of glycol dimercaptoacetate as regulator and azodiisobutyric acid dinitrile as catalyst. The viscosity of such resin was 500 cp. at 21° C. 1 p.p.m. of $Cu^{++}$ as copper naphthenate had also been mixed into such casting resin.

In the first instance the hardening liquid was stored for two days after its preparation at room temperature before us. The quantity added to the casting resin was 1.7%. The polymerization was completed in 46 minutes and a temperature maximum of 115° C. was reached. When 2% of the curing liquid was employed the polymerization time was 36 minutes.

When the hardening liquid used was stored for 4 months at +35° C., the polymerization time was the same and the maximum temperature reached was 130° C.

When the hardening liquid used was stored for 12 months at +35° C., the polymerization time was 40 minutes and the temperature maximum 135° C.

When the hardening liquid used was stored for 5 weeks at +50° C., the polymerization time was 39 minutes and the temperature maximum 130° C.

Example 2

88.9 parts of tertiary butyl perbenzoate and 11.1 parts β-phenylethyl dibutylamino-N-acetic acid ethyl ester chloride were dissolved in dimethyl phthalate to provide a 50% perbenzoate concentration. The resulting hardening liquid was employed to cure a methyl methacrylate casting resin containing $Cu^{++}$ as in Example 1 using a 2% quantity. When the hardening liquid had been stored 2 days at room temperature, the polymerization time was 64 minutes. After storage of the hardening liquid at +35° C. for 4 months and 10½ months, the polymerization times were 57 minutes and 53 minutes, respectively. The temperature maximums were 121° C., 135° C. and 132° C., respectively.

Example 3

93.6 parts of tertiary butyl perbenzoate and 6.4 parts of β-phenylethyl dibutyl benzyl ammonium chloride were dissolved in dimethyl phthalate to provide a 50% perbenzoate concentration. The resulting hardening liquid was employed to cure a methyl methacrylate casting resin containing a $Cu^{++}$ as in Example 1 using a 2% quantity. When the hardening liquid had been stored for 2 days at room temperature and for 10½ months at +35° C., the polymerization times were 63 and 67 minutes, respectively, and the temperature maximums 130° C. and 135° C., respectively.

Example 4

95.8 parts of tertiary butyl peracetate and 4.2 parts of β-phenylethyl dibutyl amine hydrochloride were dissolved in dimethyl phthalate to provide a 33.5% peracetate concentration. When 2% of such hardening liquid after one day's storage at room temperature was employed to cure a methyl methacrylate casting resin containing $Cu^{++}$ as in Example 1, the polymerization time was 74 minutes with a temperature maximum of 130° C.

Example 5

20 g. of a polyester casting resin, a 30% solution of an unsaturated polyester of maleic acid and propylene glycol-1,2 in a molar ratio of 1:1 in styrene, were cured with 2% of the hardening liquid described in Example 1. In addition to such curing liquid, 1 p.p.m. of $Cu^{++}$ as naphthenate and 1% of a 50% paste of bis(tolylsulfonmethyl)amine in dibutyl phthalate also were mixed with such casting resin.

The polymerization was ended after 4 minutes at room temperature. The temperature maximum was 196° C.

Example 6

The procedure of Example 5 was repeated except that 1% lauryl mercaptan was used instead of 1% of the 50% paste of bis(tolylsulfonmethyl)amine. The polymerization ended after 3 minutes at room temperature. The temperature maximum was 170° C.

Example 7

20 g. of a casting resin prepared by dissolving 28% of polymeric methyl methacrylate in 72% of monomeric methyl methacrylate were mixed with 1% of a 50% paste of bis(tolylsulfonmethyl)amine in dibutyl phthalate and 1 p.p.m. of $Cu^{++}$ as naphthenate and then hardened with 2% of the hardening liquid of Example 1. The polymerization ended after 23 minutes and the temperature maximum was 135° C.

Example 8

The procedure of Example 7 was repeated except that 1% of lauryl mercaptan was used instead of the 1% of the 50% paste of bis(tolylsulfonmethyl)amine. The polymerization ended after 12 minutes and the temperature maximum was 135° C.

Example 9

The procedure of Example 5 was repeated, omitting the addition of $Cu^{++}$. The polymerization ended after 23 minutes and the temperature maximum was 142° C.

Example 10

The procedure of Example 5 was repeated except that 1% of sodium toluene sulfinate instead of the 50% paste of bis(tolylsulfonmethyl)amine was mixed with the casting resin. The polymerization ended in 3 minutes and the temperature maximum was 180° C.

Example 11

The procedure of Example 10 was repeated, omitting the addition of $Cu^{++}$. The polymerization ended after 35 minutes and the temperature maximum was 109° C.

We claim:

1. A hardening liquid for curing polymerizable compositions containing at least one ploymerizable monomer containing a $CH_2=C<$ group in the presence of a sulfur containing activator comprising a solution of at least one alkyl acyl peroxide selected from the group consisting of tertiary butyl perbenzoate and tertiary butyl peracetate and at least one organic compound containing a labile chlorine atom in a plasticizer liquid, the quantity of said alkyl acyl peroxide being about 0.1 to 50% by weight of said solution, said organic compound containing a labile chlorine atom being soluble in said monomer and said plasticizer and the quantity thereof in said solution being from at least a catalytically effective quantity to about 25% by weight.

2. The hardening liquid of claim 1 in which said compound containing a labile chlorine atom is a hydrochloride of a tertiary amine.

3. The hardening liquid of claim 1 in which said compound containing a labile chlorine atom is a quaternary ammonium chloride.

4. The hardening liquid of claim 1 in which said alkyl acyl peroxide is tertiary butyl perbenzoate.

5. The hardening liquid of claim 1 in which said alkyl acyl peroxide is tertiary butyl peracetate.

6. The hardening liquid of claim 1 in which the plasticizer liquid is a dialkyl phthalate.

7. The hardening liquid of claim 1 in which the plasticizer liquid is a dialkyl adipate.

8. A method of curing a polymerizable composition containing at least one polymerizable monomer containing a $CH_2=C<$ group which comprises incorporating a sulfur containing activator in said polymerizable composition and subsequently incorporating a catalytically effective amount of a hardening liquid comprising a solution of at least one alkyl acyl peroxide selected from the group consisting of tertiary butyl perbenzoate and tertiary butyl peracetate and at least one organic compound containing a labile chlorine atom in a plasticizer liquid in said polymerizable composition, the quantity of said alkyl acyl peroxide being about 0.1 to 50% by weight of said solution, said organic compound containing a labile chlorine atom being soluble in said monomer and said plasticizer and the quantity thereof in said solution being from at least a catalytically effective quantity to about 25% by weight.

9. A method of curing a polymerizable composition containing at least one polymerizable monomer containing a $CH_2=C<$ group and a polymer thereof dissolved therein which comprises incorporating a sulfur containing activator and a catalytic organic copper compound in said polymerizable composition and subsequently incorporating a catalytically effective amount of a hardening liquid comprising a solution of at least one alkyl acyl peroxide selected from the group consisting of tertiary butyl perbenzoate and tertiary butyl peracetate and at least one organic compound containing a labile chlorine atom in a plasticizer liquid in said polymerizable composition, the quantity of said alkyl acyl peroxide being about 0.1 to 50% by weight of said solution, said organic compound containing a labile chlorine atom being soluble in said monomer and said plasticizer and the quantity thereof in said solution being from at least a catalytically effective quantity to about 25% by weight.

10. A method of curing a polymerizable composition containing polymethyl methacrylate dissolved in monomeric methyl methacrylate which comprises incorporating a sulfur containing activator and a catalytic organic copper compound in said polymerizable composition and subsequently incorporating a catalytically effective amount of a hardening liquid comprising a solution of at least one alkyl acyl peroxide selected from the group consisting of tertiary butyl perbenzoate and tertiary butyl peracetate and at least one organic compound containing a labile chlorine atom in a plasticizer liquid in said polymerizable composition, the quantity of said alkyl acyl peroxide being about 0.1 to 50% by weight of said solution, said organic compound containing a labile chlorine atom being soluble in said monomer and said plasticizer and the quantity thereof in said solution being from at least a catalytically effective quantity to about 25% by weight.

11. A method of curing a polymerizable composition containing at least one polymerizable monomer containing a $CH_2=C<$ group and an unsaturated polyester dissolved therein which comprises incorporating a sulfur containing activator in said polymerizable composition and subsequently incorporating a catalytically effective amount of a hardening liquid comprising a solution of at least one alkyl acyl peroxide selected from the group consisting of tertiary butyl perbenzoate and tertiary butyl peracetate and at least one organic compound containing a labile chlorine atom in a plasticizer liquid in said polymerizable composition, the quantity of said alkyl acyl peroxide being about 0.1 to 50% by weight of said solution, said organic compound containing a labile chlorine atom being soluble in said monomer and said plasticizer and the quantity thereof in said solution being from at least a catalytically effective quantity to about 25% by weight.

12. A method of curing a polymerizable composition containing at least one polymerizable monomer containing a $CH_2=C<$ group and an unsaturated polyester dissolved therein which comprises incorporating a sulfur containing activator and a catalytic organic copper compound in said polymerizable composition and subsequently incorporating a catalytically effective amount of a hardening liquid comprising a solution of at least one alkyl acyl peroxide selected from the group consisting of tertiary butyl perbenzoate and tertiary butyl peracetate and at least one organic compound containing a labile chlorine atom in a plasticizer liquid in said polymerizable composition, the quantity of said alkyl acyl peroxide being about 0.1 to 50% by weight of said solution, said organic compound containing a labile chlorine atom being soluble in said monomer and said plasticizer and the quantity thereof in said solution being from at least a catalytically effective quantity to about 25% by weight.

References Cited by the Examiner
UNITED STATES PATENTS

| | | | |
|---|---|---|---|
| 2,743,309 | 4/1956 | Lindsay et al. | |
| 2,822,344 | 2/1958 | Duhnkrack | 260—863 |
| 2,851,379 | 9/1958 | Staudinger et al. | |
| 2,894,932 | 7/1959 | Bader. | |
| 2,931,784 | 4/1960 | Raymond | 260—863 |
| 2,946,770 | 7/1960 | Bader et al. | 260—863 |

MORRIS LIEBMAN, *Primary Examiner.*

L. T. JACOB, *Assistant Examiner.*